Patented June 4, 1946

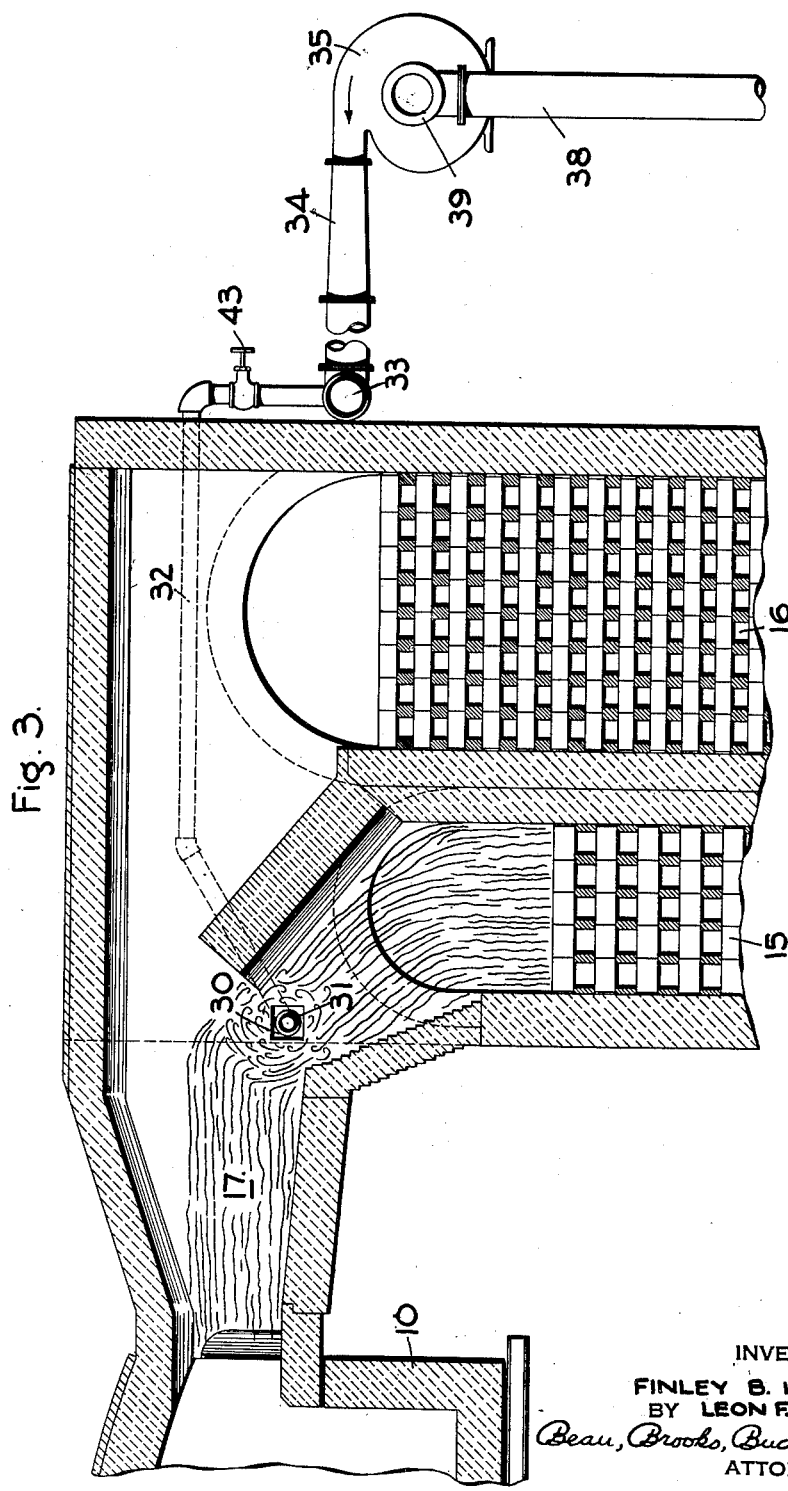

2,401,640

UNITED STATES PATENT OFFICE 2,401,640

MEANS AND METHOD OF CONTROLLING GLASS FURNACES

Finley B. Hess and Leon F. Robertson, Brockway, Pa., assignors to Brockway Glass Company, Inc., Brockway, Pa.

Application January 22, 1944, Serial No. 519,278

11 Claims. (Cl. 158—7.5)

This invention relates to glass furnaces and particularly to a novel method of controlling the firing thereof.

A common type of glass furnace is that known as a tank-furnace, wherein the glass forms a pool in the hearth of the furnace, across which the flames play directly upon the raw batch and the molten material. In regenerative tank furnaces the heat of spent gases is stored by absorption and is used to raise the temperature of incoming air for combustion in a succeeding cycle of operation for reasons of economy and efficiency, by means of reversing the direction of flow of the gases.

As is well known in the art, the flame gases of regenerative tank-furnaces, having spent their heat at the interior of the furnace, leave the combustion chamber at approximately the furnace temperature. They are then conducted through chambers known as regenerators or checker chambers. The outgoing gases give up a substantial part of their remaining heat to the "checkers". At regular intervals, the direction of flow of fuel gas and air is reversed and the incoming air and fuel gas take up the heat of the "checkers" at one side while those at the other side are being heated by exhaust gases.

In recuperative furnaces, to which the principles of the present invention apply with equal effect, the operation is not cyclic, the gases flow continuously in one direction, but the heat of spent gases is similarly absorbed and utilized.

In a producer gas fired multi-port regenerative or recuperative furnace for melting glass, the temperature gradient or the quantity of producer gas flowing to each port can be controlled, so far as the prior art is concerned, only by the proportions, as to effective area, which are given to the several ports in their initial design, or by the insertion in the passages of refractory or water-cooled dampers. This is true where the several ports are all of the same size and also where their effective areas are graduated. The ports nearest the producer receive disproportionately greater supplies of gas than the more remote ports.

The use of dampers, whether refractory, water-cooled, of cast-iron or alloy is highly unsatisfactory. After certain periods of use, removal or adjustment of the dampers is prevented by "slagging" of refractory walls adjacent the dampers, and of the grooves which receive and locate the dampers. During the latter part of the life of a furnace adequate control is further complicated, and in fact prevented, by the fact that the various ports wear differently and accordingly have varying effective areas. Sometimes the tongue arch wears away and the greater quantity of gas admitted to the particular port in this manner further disrupts the temperature gradient.

In view of the difficulties and disadvantages attendant upon prior art methods of control, producer gas was not efficiently usable in smaller tank furnaces because of its slow rate of combustion and its consequent long flame. A great part of the effective heat at the end of the flame would be emitted in the ports and checker chambers at the opposite side of the furnace and these areas would be subject to excessive erosion. The prior art thus lacked suitable control means and, particularly, it lacked control means which would remain effective throughout the life of the furnace.

The present invention comprises a novel and useful means and method of controlling the entering air or air-fuel mixture to control the evolution of heat within a furnace. According to the present invention, a forced current of air or gas is directed transversely to and impinged against the incoming column of fuel gas, air, or air-fuel mixture, to set up turbulence and air-friction conditions which impede the normal aerodynamic flow of fuel gas, air, or air-fuel mixture. By controlling the transverse impinging blast of air or gas, the rate of flow of fluid to the burners at the furnace tank entrance may be accurately controlled. Further, this end is accomplished without the interposition of anything in the way of valves, dampers or baffles in the furnace entrance passageways, the regenerators themselves, or the uptakes.

As a further refinement the gas employed in the transverse stream may be either air or a relatively inert gas, such as the flue gas which comes to the stack from the furnace or from its regenerators or absorbers. In the present instance further improved operation is accomplished by using a mixture of raw air and spent flue gas, with means for adjustably proportioning the two components of the mixture to thereby regulate the percentage of free oxygen thus introduced into the combustion reaction.

In a preferred form blasts or jets of air or gas or a mixture of both are directed toward each other from opposite sides of a passage, whereby they meet at the center and their impingement sets up turbulence which combines with the natural turbulence of the fluid flowing through the passage. By controlling and adjusting these jets it is possible not only to control the supply of gas but to control the length of the flame in the furnace and the distribution of heat therefrom. By selectively and accurately controlling the several individual flames in a multi-port furnace the entire heat pattern and temperature gradient arrangement within the furnace is nicely and accurately determined by the operator of the furnace.

While a single complete and specific embodiment of the invention is shown in the drawings and described in detail in the ensuing specification, it is to be understood that this is done by way of example only. The principles of the present invention are not limited in spirit or scope, otherwise than as defined in the appended claims.

In the drawings:

Fig. 3 is a fragmentary cross sectional view on a larger scale taken on a vertical plane and showing the upper portions of one set of regenerators and the ports therefrom to the furnace.

Figure 1:
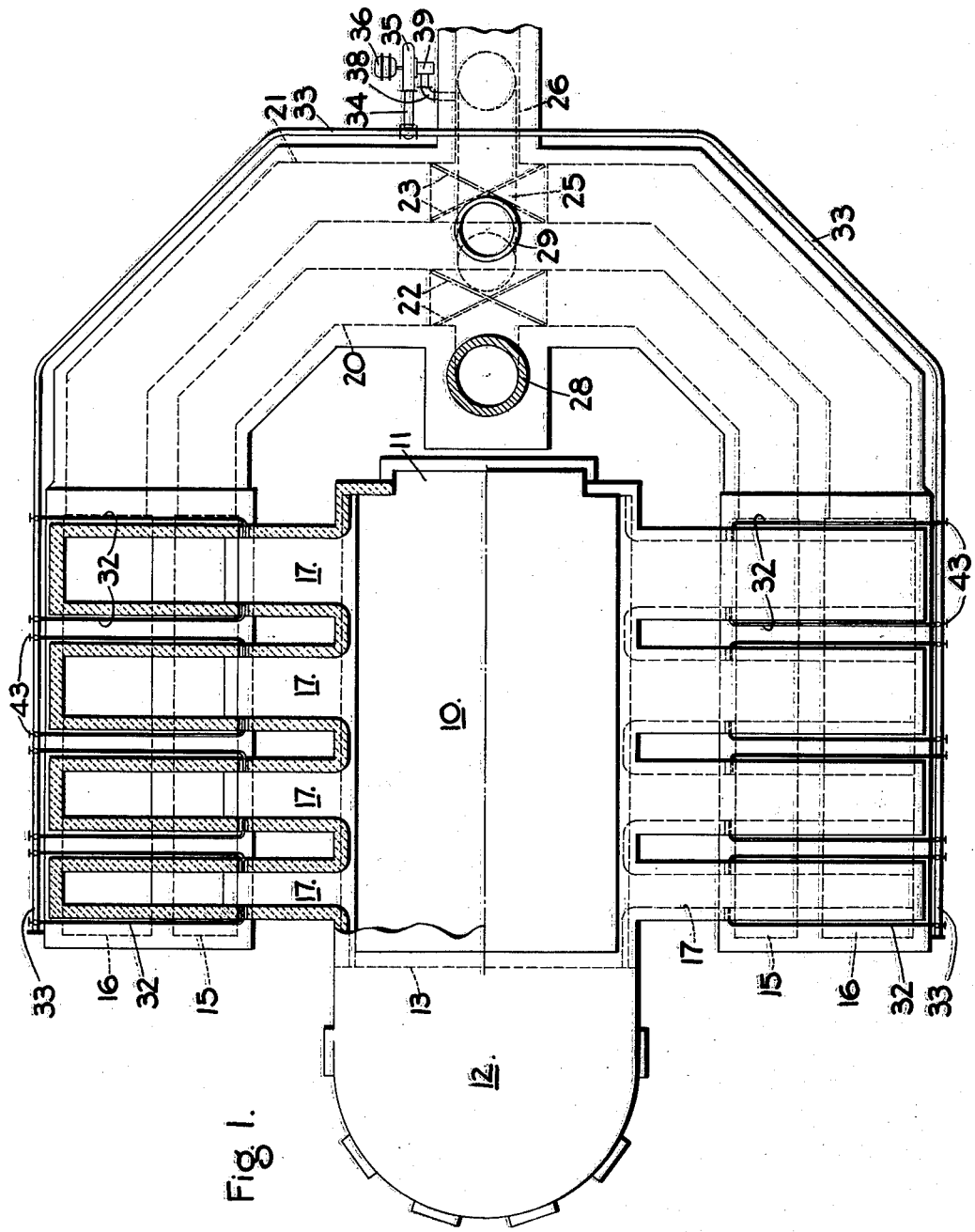
Fig. 1 is a general top plan view of a regenerative producer-gas-fired tank-furnace equipped with apparatus for achieving the objects of the present invention and with a portion of the furnace crown or arch and certain of the port caps removed.
Figure 2:
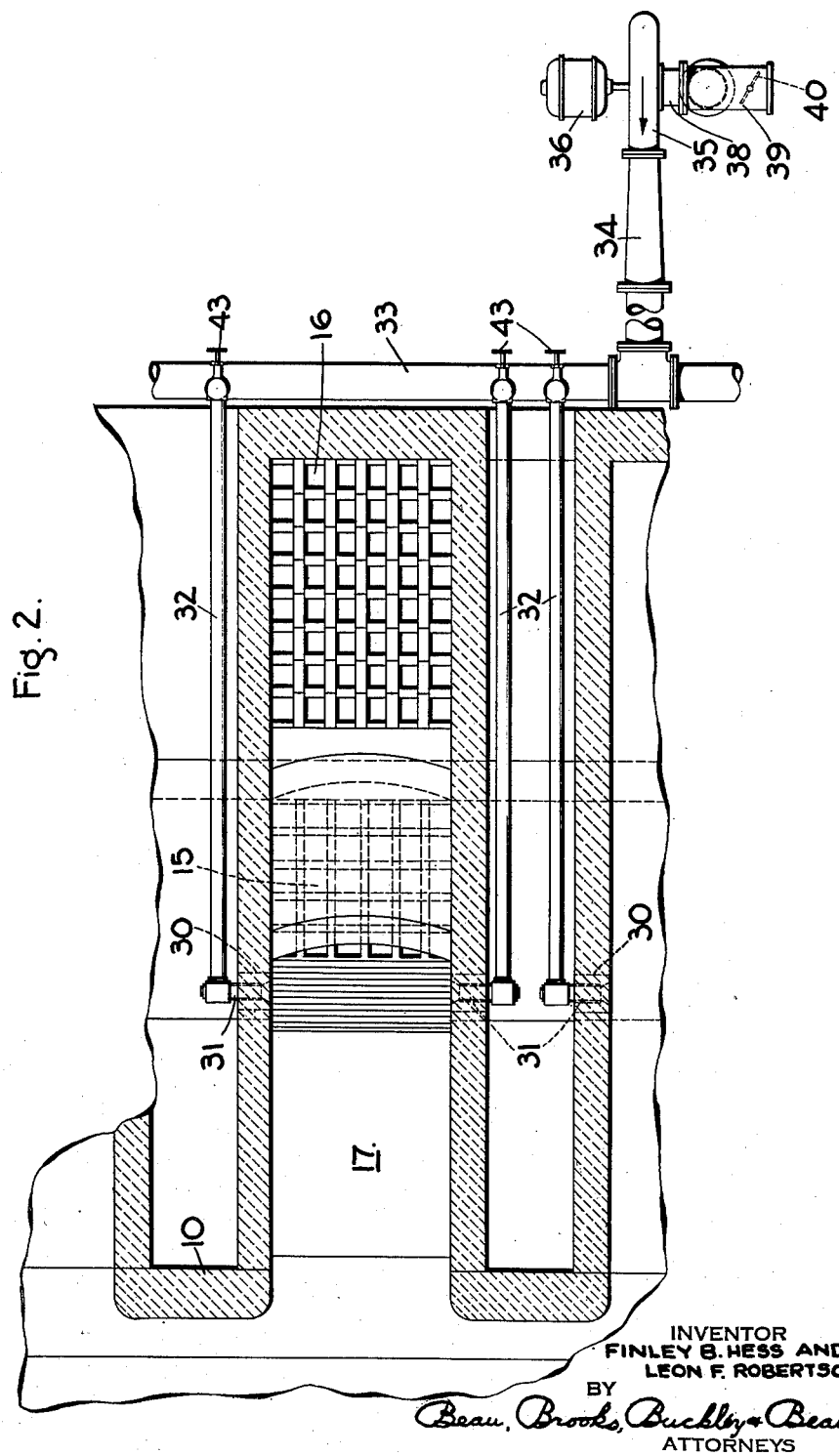
Fig. 2 is a fragmentary horizontal cross sectional view of one side of the furnace of Fig. 1 on a larger scale showing one set of regenerators in plan.

Throughout the several figures of the drawings, like characters of reference denote like parts and, referring to Fig. 1, the numeral 10 designates a tank-furnace having a batch receiving "dog house" 11 and a "nose" or working chamber 12, the latter being set apart from the tank proper by a conventional bridge wall 13. Referring now also to Figs. 2 and 3, the regenerator checker chambers for producer gas and air are designated 15 and 16 respectively and their uptakes merge with a series of lateral conduits or ports 17 which open into the interior of the tank proper. The gas-air mixture ignites at or just prior to the point where conduits or ports 17 open into the tank proper.

It is to be noted that the nicety of control afforded by means of the present invention permits the use of one continuous checker chamber at each side of the furnace for the fuel gas regenerator and a second continuous checker chamber at each side of the furnace for air to support combustion. Without the means and method of the present invention the several conduits 17 would, to insure some degree of uniformity of combustion, require individual regenerating towers for each of the ports or conduits, which renders furnace construction complicated and very much more expensive.

Referring again to Fig. 1, a conduit 20 extends between the producer gas checker chamber 15 at each side of the furnace and a conduit 21 extends between the pair of air passage checker chambers 16. The conduits 20 and 21 are provided with reversing valves 22 and 23, respectively. In the position in which the valves are shown in dash lines in Fig. 1, the burners at the lower side of the sheet of Fig. 1 are active and the checker chambers at the upper side of the drawing are receiving hot gases from the furnace. After traversing the checker chambers and arriving at valves 22 and 23, the exhaust gases are directed by the valves into conduits 25 and 26 which lead to a stack (not shown). With the valves positioned as shown in Fig. 1, the portion of conduit 20 at the lower side of Fig. 1 is in communication with a producer gas inlet main 28 and the corresponding portion of conduit 21 is in communication with an air inlet 29.

Referring to Figs. 2 and 3, openings 30 are formed in the opposite side walls of the uptakes from the producer gas checker chambers 15 at approximately the point where they merge with conduits 17 and jets 31 project into the openings 30 from branch fluid conduits 32 which in turn extend from a main fluid conduit 33. The conduit 33 has a connection 34 with the output side of a pump 35 driven by a suitable motor 36. The inlet side of pump 35 has a conduit 38 which communicates with stack conduit 26 and a branch inlet conduit 39 controllable by a valve 40. The branch conduit 39 communicates with the atmosphere and by adjustment of valve 40 the fluid directed into conduits 33 and 32 by pump 35 may be selectively proportioned, as between fresh air containing free oxygen and the relatively inert waste flue gas going to the stack.

The force of the jets of gas which are thus directed toward each other across the path of the incoming producer gas for impingement against each other may be selectively and independently adjusted by manual valves 43, one of which is associated with each branch conduit 32.

What is claimed is:

1. In a glass furnace, a melting chamber, conduit means for conducting a combustible and combustion supporting gaseous mixture thereto, opposed jet means at opposite sides of said conduit means, and means for directing adjustable gaseous blasts from said jet means across said conduit means to impede the normal flow of gaseous mixture in said conduit means and accordingly regulate the intensity of combustion and the resulting temperature in the melting chamber.

2. In a producer gas fired regenerative glass furnace, a melting chamber, alternately operative pairs of regenerators, each pair of regenerators comprising a producer gas inlet passage and an air inlet passage, a common conduit from said pair of passages to said melting chamber, means for directing a transverse blast of gas across the producer gas inlet passage adjacent said common conduit to impede the normal supply of producer gas to the furnace, and means for selectively adjusting the intensity of the blast to control furnace temperature.

3. In a glass furnace, a melting chamber, a plurality of conduit means for delivering a combustible and combustion supporting gaseous mixture to said melting chamber at a plurality of combustion zones, opposed jet means at opposite sides of each of said conduit means, means for directing gaseous streams from said jet means across said conduit means to impede the normal flow of gaseous mixture in said conduit means, and means for selectively and independently adjusting the intensity of said streams to control the fuel supply at the several combustion zones whereby to accurately control temperature in the melting chamber.

4. A method of controlling combustion in a producer gas fired glass furnace which comprises conducting a stream of producer gas to a heating chamber directing a blast of gas across the inflowing producer gas to impede the same, and varying the intensity of said stream to vary the supply of gas to the combustion zone and thereby regulate the temperature in the melting chamber of the furnace.

5. A method of controlling combustion in a producer gas fired glass furnace which comprises directing a stream of producer gas into said furnace and directing a second stream of mixed air and relatively inert gas across the inflowing producer gas to impede the same, varying the intensity of said second stream to vary the rate of flow of producer gas to the combustion zone, and varying the relative proportions of the mixture of air and relatively inert gas to regulate the amount of free oxygen introduced by said stream.

6. In a glass furnace, a melting chamber, conduit means for conducting a combustible and combustion supporting gaseous mixture thereto, means for directing a transverse stream of gas across the conduit means to impede the normal flow of gaseous mixture therethrough, means for selectively adjusting the intensity of the transverse stream to control the supply of gaseous mixture to the furnace, said transverse stream comprising a mixture of air and relatively inert gas, and valve means for regulating the proportion of air and inert gas in said transverse stream to regulate the amount of free oxygen thus introduced.

7. In a glass furnace, a melting chamber, conduit means for conducting a combustible and combustion supporting gaseous mixture thereto, a stack and other conduit means for conducting products of combustion from the melting chamber to said stack, means for directing a transverse stream of gas across the first conduit means to impede the normal flow of gaseous mixture therethrough, means for selectively adjusting the intensity of the transverse stream to control the supply of gaseous mixture to the furnace, a conduit connection between said stream directing means and said other conduit means and a source of air likewise connected with said stream directing means, and valve means for varying the proportion of oxygen containing air and relatively inert stack gas introduced to said first conduit means by said transverse stream.

8. A method of controlling combustion in the melting chamber of a glass furnace heated by combustion comprising flowing gaseous components of the chemical reaction of combustion to a combustion zone, directing a gaseous stream across the flowing gaseous components to impede flow thereof and varying the intensity of said stream to vary the supply of gaseous components to the combustion zone and thereby regulate the temperature in the melting chamber of the furnace.

9. A method of controlling combustion in the melting chamber of a glass furnace heated by combustion comprising flowing the gaseous components of the chemical reaction of combustion to a plurality of combustion zones in a plurality of streams, directing other gaseous streams across each of said streams to impede fluid flow thereof, and selectively and independently varying the intensity of said other streams to independently vary the supply of gaseous components to the several combustion zones whereby to accurately control uniformity of temperature throughout the melting chamber.

10. A method of controlling combustion in a glass furnace heated by combustion comprising flowing gaseous components of the combustion to a combustion zone, directing a stream of mixed air and relatively inert gas across the flowing gaseous components to impede fluid flow thereof, varying the intensity of said stream to vary the supply of gaseous components to the combustion zone, and varying the relative portions of the mixture of air and relatively inert gas to regulate the amount of free oxygen introduced by said stream.

11. A method of controlling combustion in a glass furnace heated by combustion comprising flowing gaseous components of the combustion to the point of combustion, directing a stream of mixed air and stack gas across the flowing gaseous components to impede the flow thereof, regulating the intensity of said stream to vary the supply of gaseous components to the point of combustion, and regulating the relative portions of air and stack gas in said mixture to control the quantity of free oxygen introduced by said stream.

FINLEY B. HESS.
LEON F. ROBERTSON.